United States Patent
Okumura et al.

(10) Patent No.: US 9,790,389 B2
(45) Date of Patent: Oct. 17, 2017

(54) WATER-BASED INK FOR INK-JET RECORDING AND INK CARTRIDGE

(71) Applicant: Brother Kogyo Kabushiki Kaisha, Nagoya-shi, Aichi-ken (JP)

(72) Inventors: Yuki Okumura, Ichinomiya (JP); Mitsunori Maeda, Nagoya (JP); Hiroyuki Tanaka, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/255,197

(22) Filed: Sep. 2, 2016

(65) Prior Publication Data

US 2017/0088734 A1    Mar. 30, 2017

(30) Foreign Application Priority Data

Sep. 30, 2015 (JP) .................................. 2015-195502

(51) Int. Cl.
    *C09D 11/326* (2014.01)
    *C09D 11/38* (2014.01)
    *C09D 11/322* (2014.01)

(52) U.S. Cl.
    CPC ............ *C09D 11/38* (2013.01); *C09D 11/322* (2013.01); *C09D 11/326* (2013.01)

(58) Field of Classification Search
    USPC ........................................................ 523/160
    See application file for complete search history.

(56) References Cited

U.S. PATENT DOCUMENTS

| | | | | |
|---|---|---|---|---|
| 5,272,201 A * | 12/1993 | Ma | ........................ | C09D 11/326 524/505 |
| 6,132,502 A * | 10/2000 | Yatake | .................. | C09D 11/322 106/31.86 |
| 8,016,404 B2 | 9/2011 | Kato et al. | | |
| 2004/0059019 A1* | 3/2004 | Nakano | ................... | C09D 11/30 523/160 |
| 2005/0117008 A1* | 6/2005 | Konishi | .................. | C09D 11/40 347/100 |
| 2007/0097155 A1 | 5/2007 | Imai et al. | | |
| 2008/0241398 A1 | 10/2008 | Kato et al. | | |
| 2008/0248260 A1* | 10/2008 | Kojima | ................... | C09D 11/30 428/195.1 |
| 2011/0300353 A1 | 12/2011 | Habashi et al. | | |
| 2012/0081477 A1 | 4/2012 | Nagano | | |
| 2012/0268515 A1* | 10/2012 | Fukasaka | ............... | B41J 11/009 347/16 |

FOREIGN PATENT DOCUMENTS

| | | | |
|---|---|---|---|
| JP | 2003-055590 A | 2/2003 | |
| JP | 2008-246821 A | 10/2008 | |
| JP | 2012-025880 A | 2/2012 | |
| WO | WO 2012082991 A2 * | 6/2012 | ............. B82Y 30/00 |

OTHER PUBLICATIONS

Nov. 24, 2016—(EP) Extended Search Report—App 16188186.7.

* cited by examiner

*Primary Examiner* — Vu A Nguyen
(74) *Attorney, Agent, or Firm* — Banner & Witcoff, Ltd.

(57) ABSTRACT

A water-based ink for ink-jet recording includes: a pigment; water; a pigment dispersing resin including an ethylene oxide chain; and at least one of an anionic surfactant including an ethylene oxide group and a nonionic surfactant including an ethylene oxide group.

21 Claims, 1 Drawing Sheet

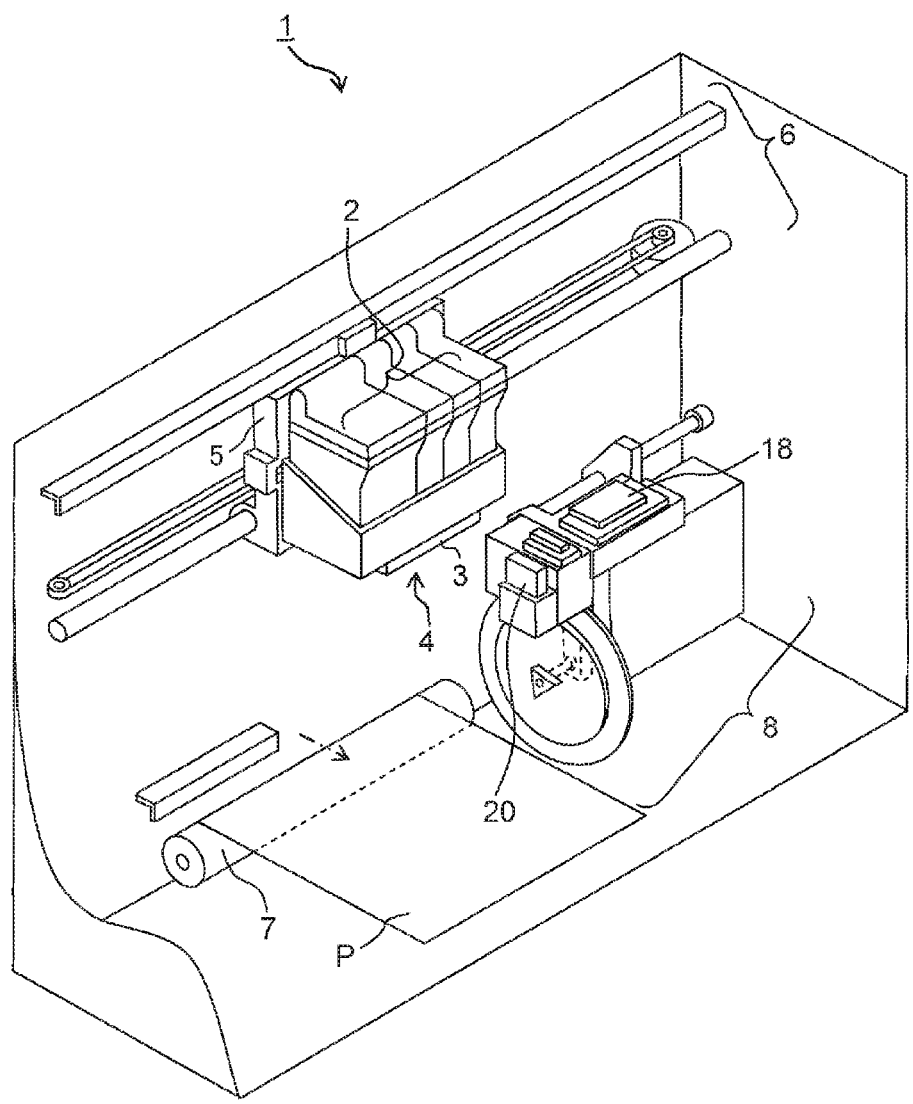

WATER-BASED INK FOR INK-JET RECORDING AND INK CARTRIDGE

CROSS REFERENCE TO RELATED APPLICATION

The present application claims priority from Japanese Patent Application No. 2015-195502, filed on Sep. 30, 2015, the disclosure of which is incorporated herein by reference in its entirety.

BACKGROUND OF THE INVENTION

Field of the Invention

The present invention relates to a water-based ink for ink-jet recording and an ink cartridge.

Description of the Related Art

For ink-jet recording, a water-based pigment ink for ink-jet recording in which a pigment is used as a colorant is conventionally used. Since the pigment is insoluble to water, a technique for dispersing the pigment stably in the water is required. As a method for dispersing the pigment in the water, a method using a resin for dispersing pigment (pigment dispersing resin) is known. For example, Japanese Patent Application Laid-open No. 2012-25880 proposes a water-based pigment ink containing a pigment, a pigment dispersing resin and water.

In the recent years, as the ink-jet recording is performed at a high speed, a water-based ink for ink-jet recording suitable for high speed-recording is used. The water-based pigment ink for ink-jet recording using the pigment dispersing resin, however, has such a problem that discharge of the ink becomes unstable as the number of sheets of paper or recording medium, etc., is increased. For example, the water-based pigment ink using the pigment dispersing resin has such a problem that any warping (bending or deflection) of recording and white void of pinhole shape occur during a continuous recording, which in turn makes the discharge of the ink be unstable. Further, the water-based pigment ink for ink-jet recording using the pigment dispersing resin is also required to have an improved re-dispersibility (re-dispersion property).

In view of the above situation, an object of the present teaching is to provide a water-based pigment ink for ink-jet recording which is capable of improving the discharging stability during continuous recording and which is also excellent in the re-dispersibility.

SUMMARY OF THE INVENTION

According to a first aspect related to the present teaching, there is provided a water-based ink for ink-jet recording including: a pigment; water; pigment dispersing resin including an ethylene oxide chain; and at least one of an anionic surfactant including an ethylene oxide group and a nonionic surfactant including an ethylene oxide group.

According to a second aspect related to the present teaching, there is provided an ink cartridge containing the water-based ink for ink-jet recording of the first aspect related to the present teaching.

BRIEF DESCRIPTION OF THE DRAWINGS

FIGURE is a perspective view schematically illustrating the configuration of an example of an ink-jet recording apparatus related to the present teaching.

DESCRIPTION OF THE PREFERRED EMBODIMENTS

In this specification, "at least one of methacrylic acid and acrylic acid" is described as "(meth)acrylic acid" in some cases; similarly, "at least one of methacrylate and acrylate" is described as "(meth)acrylate" in some cases; and "at least one of methacrylonitrile and acrylonitrile" is described as "(meth)acrylonitrile" in some cases. Further, in this specification, the number of monomers in a polymer is described, for example, as (n=not less than 1), (m=not less than 1), etc., in some cases. Here, in a case that "n" and "m" are both not less than 1, then it is meant that such a substance is not limited to a polymer, but may be a monomer as well. Furthermore, in the specification, in a case for example that ethylene glycol monomethyl ether and ethylene glycol monoethyl ether may be used, the description is made such as ethylene glycol monomethyl (or ethyl) ether, etc.

In the present teaching, the term "re-dispersion property (re-dispersibility)" in a water-based ink means, for example, the solubility and dispersion property (dispersibility) of a solid matter, in the water-based ink, generated after the water-based ink is once evaporated to dry with resultant solid matter, the solubility and dispersibility being those of when the solid matter is then newly brought in contact with the water-based ink. If the water-based ink has an unsatisfactory re-dispersibility, then, for example, the following problem arises: namely, in a case that the water-based ink is heated in an ink-jet head and then is evaporated and solidified to thereby generate a solid matter, the solid matter is not dissolved and dispersed when the solid matter is then newly brought in contact with the water-based ink, which in turn might cause any discharge failure. Further, in the present specification, the term "warping (bending or deflection)" means such a phenomenon that a dot of the water-based ink does not land at an intended landing position (ideal landing position) on the recording medium, but instead lands at a shifted or deviated position from the intended landing position (there is a landing error of the dot).

A water-based ink for ink-jet recording (hereinafter referred to as "water-based ink", "ink", "ink-jet ink" or "water-based pigment ink for ink-jet recording", in some cases) related to the present teaching will be explained. The water-based ink for ink-jet recording related to the present teaching includes: a pigment; water; a pigment dispersing resin including an ethylene oxide chain (hereinafter referred to as "EO chain", in some cases) (hereinafter referred to as "EO chain-including pigment dispersing resin", "pigment dispersing resin", "pigment dispersant", or "dispersant", in some cases); and at least one of an anionic surfactant including an ethylene oxide group (hereinafter referred to as "EO group", in some cases) (hereinafter referred to as "EO group-including anionic surfactant", in some cases) and a nonionic surfactant including an ethylene oxide group (hereinafter referred to as "EO group-including nonionic surfactant", in some cases).

The pigment is not particularly limited, and is exemplified, for example, by carbon black, an inorganic pigment, an organic pigment, etc. The carbon black is exemplified, for example, by furnace black, lamp black, acetylene black, channel black, etc. The inorganic pigment is exemplified, for example, by titanium oxide, inorganic pigments based on iron oxide, inorganic pigments based on carbon black, etc. The organic pigment is exemplified, for example, by azo-pigments such as azo lake, insoluble azo-pigment, condensed azo-pigment, chelate azo-pigment, etc.; polycyclic pigments such as phthalocyanine pigment, perylene and perynon pigments, anthraquinone pigment, quinacridone pigment, dioxadine pigment, thioindigo pigment, isoindolinone pigment, quinophthalone pigment etc.; dye lake pigments such as basic dye type lake pigment, acid dye type lake pigment etc.; nitro pigments; nitroso pigments; aniline black daylight fluorescent pigment; and the like. Further, any pigments different from those listed above can be used, provided that such pigments are soluble in aqueous phase.

Specific examples of the pigment include, for example, C. I. Pigment Blacks 1, 6, and 7; C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 19 and 196; C. I. Pigment Blues 1, 2, 3, 15, 15:1, 15:2, 15:3, 15:4, 16, 22, and 60; C. I. Pigment Greens 7 and 36; and the like. Further, the pigment may be a solid solution of any one of the above-described pigments. It is allowable to use any one of the above-described pigments singly, or to use two or more kinds of the above-described pigments in a mixed manner. A method for mixing the pigments is exemplified, for example, by mixing the pigments as powdery pigments, mixing the pigments as paste pigments, preparation of solid solutions by performing mixing during formation of the pigments, etc., and it is possible to use, as the method for mixing the pigments, any one of these methods. Further, as necessary, it is allowable to use a processed pigment of which surface is processed with a pigment derivative, a self-dispersible pigment which can be obtained by introducing, to a surface thereof, a hydrophilic group (for example, carboxyl group, sulfonic acid group, phosphoric acid group, ethylene oxide chain, etc.); etc.

The solid content blending amount of the pigment (pigment solid content amount) in the entire amount of the water-based ink is not particularly limited, and may be appropriately determined based on, for example, a desired optical density or color (chromaticness, hue, tint), etc. The pigment solid content amount is, for example, in a range of 0.1% by weight to 20% by weight, in a range of 1% by weight to 15% by weight, or in a range of 2% by weight to 10% by weight.

It is allowable that the water-based ink further contains a colorant which is different from the above-described pigment, in addition to the above-described pigment, or that the water-based ink does not further contain any colorant which is different from the above-described pigment. Such a colorant different from the pigment is exemplified, for example, a dye, etc. The main component of the colorant contained in the water-based ink is preferably a resin dispersion-type pigment. The blending amount of the resin dispersion-type pigment in the colorant is, for example, in a range of 10% by weight to 100% by weight, or 20% by weight to 100% by weight.

The water is preferably ion-exchanged water or pure water (purified water). The blending amount of the water (water ratio) in the entire amount of the water-based ink is, for example, in a range of 10% by weight to 90% by weight, preferably in a range of 40% by weight to 80% by weight. The water ratio may be, for example, the balance of the other components.

The structure of the pigment dispersant is not particularly limited provided that the pigment dispersant contains the EO chain, and the structure, for example, as explained below.

As the pigment dispersant, a polymer obtained by polymerizing a monomer having an α, β-unsaturated bond (hereinafter referred to simply as "monomer") is used. This polymer contains, as a constituent component thereof, at least a monomer having an acid group such as carboxyl group, sulfonic acid group, phosphoric acid group, etc, and introducing thereinto a monomer having a hydroxyl group and/or an ethylene oxide chain as necessary. The polymer is a hydrophilic polymer that is soluble, dispersible or emulsifiable in water by neutralizing the acid group with the alkali to be ionized.

Firstly, the monomer having the acid group is not particularly limited and is exemplified, for example, by: vinyl-based monomers such as vinyl benzoic acid, styrenesulfonic acid, vinyl sulfonic acid, etc.; (meth)acrylic acid-based monomers such as (meth)acrylic acid, monomethacyrliate of a dibasic acid obtained by reacting a hydroxyl group of such as (meth)acrylic acid-2-hydroxyethyl, (meth)acrylic acid-2-hydroxypropyl, etc., with a phthalic acid, a succinic acid, etc., methacrylic acid ethylsulfonic acid, (meth)acryloyloxyethyl monophosphonate, etc.; and monomers having 2 carboxyl groups such as maleic acid, itaconic acid, etc.; amide-based monomers such as (meth)acrylamide methyl propanesulfonic acid, etc. One or more kinds of these monomers can be used. By neutralizing the polymer having one or more kinds of the monomer having the acid group introduced thereinto, with an alkali, the hydrophilicity of the polymer is enhanced so that the polymer can be dissolved, dispersed or emulsified in the water.

The alkali is not particularly limited. The alkali can be exemplified by ammonia; organic amines such as trimethylamine, triethylamine, dimethyl aminoethanol, aminoethanol, diethanolamine, triethanolamine, aminomethylpropanol, etc.; alkali metal hydroxides such as lithium hydroxide, sodium hydroxide, potassium hydroxide, etc.; and the like, and the alkali neutralizes the introduced acid group. The neutralization rate by the alkali is not particularly limited, and is adjusted in accordance with a necessary pH required for the usage and/or application by neutralizing all of, or a portion of the acid group introduced into the polymer, or by excessively neutralizing the introduced acid group.

Further, it is allowable to use a monomer having a hydroxyl group or an ethylene oxide chain in order to impart the hydrophilicity. The monomer is not particularly limited, and the usable monomers are exemplified by: (meth)acrylates having a hydroxyl group such as (meth)acrylic acid-2-hydroxyethyl, (meth)acrylic acid-2-hydroxypropyl, glycyl mono(meth)acrylate, etc.; polyalkylene glycerol monomethacrylates such as poly (n=not less than 2) ethylene glycol monomethacrylate, poly (n=not less than 2) propylene glycol monomethacrylate, poly (n=not less than 1) ethyleneglycol poly (m=not less than 1) propylene glycol mono(meth) acrylate, etc.; (meth)acrylates of which hydroxyl group is esterified by an fatty acid or an aromatic carboxylic acid; alkoxy or allyloxy polyalkylene glycol (meth)acrylates such as methoxy poly(n=not less than 1) ethylene glycol (meth) acrylate, ethoxy poly (n=not less than 1) ethylene glycol (meth)acrylate, dodecyl poly (n=not less than 1) ethylene glycol (meth)acrylate, phenoxy poly (n=not less than 1) ethylene glycol (meth)acrylate, nonylphenylpoly (n=not less than 1) ethylene glycol (meth)acrylate, methacrylic acid poly (n=not less than 1) ethylene glycol monocumyl ether, etc. Other than these, monomers having a polymerizable group and imparting the hydrophilicity such as a vinyl-based monomer, aryl-based monomer, a reactive surfactant, etc may be used.

As the pigment dispersant related to the present teaching, a pigment dispersant having such a configuration in which a monomer having an acid group is used singly or in combination with a monomer imparting the hydrophilicity is preferably used. Among them, the configuration wherein the monomer having the acid group is used in combination with the monomer imparting the hydrophilicity is effective for realizing the storing stability of an ink. Further, another configuration wherein other monomer is polymerized so as to adjust the hydrophilicity and to thereby impart the water resistance is also capable of further improving the pigment dispersibility at the same time.

The other monomer is not particularly limited, and is exemplified by vinyl-based monomers such as styrene, vinyl toluene, vinyl ethylbenzene, α-methyl styrene, vinyl naphthalene, vinyl biphenyl, (meth)acrylonitrile, vinyl caprolactone, vinyl carbazole, vinyl pyrrolidone, etc.; methacrylates such as (meth)acrylic acid methyl, (meth)acrylic acid ethyl, (meth)acrylic acid propyl, (meth)acrylic acid butyl, (meth)acrylic acid hexyl, (meth)acrylic acid octyl, (meth)acrylic acid 2-ethylhexyl, (meth)acrylic acid decyl, (meth)acrylic acid dodecyl, (meth)acrylic acid tridecyl, (meth)acrylic acid octadecyl, (meth)acrylic acid behenyl, (meth)acrylic acid cyclohexyl, (meth)acrylic acid t-butyl cyclohexyl, (meth) acrylic acid trimethyl cyclohexyl, (meth)acrylic acid tricyclodecyl, (meth)acrylic acid isobornyl, (meth)acrylic acid adamantyl, (meth)acrylic acid benzyl, (meth)acrylic acid phenyl, (meth)acrylic acid naphthyl, (meth)acrylic acid dimethyl aminoethyl, (meth)acrylic acid diethyl aminoethyl, and as necessary, (meth)acrylate of quaternary ammonium salt type, etc.; alkanoic acid vinyl ester-based monomers such as vinyl acetate, vinyl propionate, etc.; amide-based monomers such as (meth)acrylamide, dimethyl (meth)acrylamide, etc.; and the like. One or more kinds of these monomers is/are used to thereby adjust the hydrophilicity and impart the pigment dispersiblity. Further, as necessary, it is allowable to use a polymer-type monomer of polystyrene modified to have an unsaturated group at one terminal thereof, a macromonomer, etc.

The polymer as the pigment dispersant related to the present teaching has the above-described monomer composition of which structure is not limited and includes, for example, random structure, alternating copolymerization structure, block structure, gradient structure, grafted structure, multi-branched structure, etc. The block structure and the grafted structure are particularly preferred. Regarding the block structure, by providing a block copolymer having a water-insoluble chain and a water-soluble chain, the adsorbing property of a polymer composed of the water-insoluble chain to the pigment is improved, thereby maintaining superior micro-dispersibility and stability.

The polymer as the pigment dispersant used in the present teaching is composed of the above-described monomer. An introduction amount of the monomer having an acid group necessary for imparting the hydrophilicity can be defined by an acid value. The acid value can be plainly expressed as the mass of potassium hydroxide (KOH) in milligrams (mg) required to neutralize 1 (one) gram of the polymer. For example, the acid value can be calculated by dissolving a predetermined amount of the polymer in a mixed organic solvent of toluene and ethanol in which toluene/ethanol=1/1, and by performing titration with a 0.1N potassium hydroxide-ethanol solution, with phenolphthalein as an indicator. The acid value of the polymer used in the present teaching is preferably in a range of 40 mgKOH/g to 200 mgKOH/g, more preferably in a range of 50 mgKOH/g to 150 mgKOH/g, further more preferably in a range of 50 mgKOH/g to 130 mgKOH/g. In a case that the acid value is less than 40 mgKOH/g, the water solubility is not sufficient, this leads to insufficient storing stability and/or insufficient hydrophilic-ity of the pigment, thus resulting, in some cases, in insufficient redissolvability that is an action causing an ink for ink-jet recording to re-disperse after being dried. On the other hand, in a case that the acid value exceeds 200 mgKOH/g, this leads to lowered storing stability of the ink and/or insufficient water resistance of a printed matter formed by the ink, in some cases. Note that, however, hydrophilicity, the redissolvability, the water resistance, etc. may be adjusted as necessary in view of the solvent environment, etc, thus an aspect is also preferable depending on the usage, in which the acid value of the polymer is adjusted to be the outside of the above-described range. Further, in the method for adjusting the monomer composition, it is preferred that the hydrophilic monomer as described above is a component (constituent) in a case that the acid value is low. In addition, it is preferred that the hydrophilic monomer is a component (constituent) in order to also provide the water solubility. The introducing amount of the hydrophilic monomer is not particularly limited, and may be designed to be any amount depending on the characteristic of usage.

Next, the molecular weight of the pigment dispersant used in the present teaching is not particularly limited. Here, the term "molecular weight" is number-average molecular weight which is polystyrene conversion number-average molecular weight by a gel permeation chromatography, or weight-average molecular weight. In the present teaching, the molecular weight means the number-average molecular weight. The molecular weight is in a range of 1,000 to 100,000, more preferably in a range of 5,000 to 50,000, further more preferably in a range of 5,000 to 20,000. In a case that the molecular weight is less than 1,000, the molecular weight is so small that any detachment (desorption) of the pigment occurs, and/or that the pigment is dissolved in an organic solvent in an ink for ink-jet recording in which the pigment is used, which in turn makes it impossible to maintain the dispersibility and/or the storing stability of the pigment, in some cases. On the other hand, in a case that the molecular weight exceeds 100000, the viscosity of the ink is increased, and/or any microdispersibility cannot be realized, in some cases, due to the adsorption between many particles of the pigment. The molecular weight distribution (weight-average molecular weight/number-average molecular weight, PDI) is not particularly limited. In a case that the molecular weight distribution is not more than 1.5, the molecular weights are uniform, which in turn makes the properties of the polymer molecules be uniform, thereby improving the pigment dispersibility. In a case that the molecular weight distribution exceeds 1.5, polymer molecules of a low molecular weight and polymer molecules of a high molecular weight are consequently included. However, the polymer molecules of the low molecular weight contribute to the wettability of the pigment, and the polymer molecules of the high molecular weight are not dissolved in a liquid medium of the ink for ink-jet recording due to large molecular weight thereof, and adsorb to the pigment; in such a case, the polymer molecules of the high molecular weight do not detach from the pigment, thereby improving the storing stability of the pigment and/or preventing the pigment from penetrating through paper, resulting in an improved chromogenic property.

These monomers as described above are polymerized as the components of a polymer as the pigment dispersant, so as to obtain the polymer as the pigment dispersant. The polymerization method is not particularly limited, and any conventionally known polymerization method can be used. Specifically, the polymerization method includes radical polymerization, living radical polymerization, cation polymerization, and anion polymerization. The radical and living radical polymerizations are preferred and can be performed in a polymerization process such as solution polymerization, emulsion polymerization, dispersion polymerization, bulk polymerization, etc. A solution polymerization by the radical or living radical polymerization is more preferred since the solution polymerization is easily performed without any necessity for adjusting the molecular weight and refining the raw material. In addition, with the solution polymerization, the monomer is polymerized in a solvent usable in an ink for ink-jet recording, and a resultant dispersant solution as it is and the pigment are dispersed with each other to thereby obtain a pigment dispersion.

The radical polymerization is not particularly limited, and a general azo-based initiator and/or a peroxide-based initiator can be used to perform the polymerization. The azo-based initiator is exemplified by azobisisobutyronitrile, azo-bisisovaleric acid, etc. The peroxide-based initiator is exemplified by benzoyl peroxide, lauryl peroxide, etc. Further, it is possible to use any chain transfer agent which is exemplified by thiol, alkyl halide, α-methyl styrene dimer, etc. By using the chain transfer agent, the molecular weight can be adjusted to a certain extent. Furthermore, it is possible to use a cobalt-based compound as an irreversible additional cleavage-type chain transfer agent.

The living radical polymerization can take a various kinds of methods, and is not particularly limited. Examples of the living radical polymerization include the NMP (Nitroxide-mediated Polymerization) process using nitroxide, the atom transfer radical polymerization process (ATRP process) utilizing reduction oxidation using a metal complex, the reversible additional cleavage-type chain transfer polymerization process (RAFT process) using dithioester, etc., the TERP process (Tellurium mediated Radical Polymerization process) using organic tellurium, etc., without being particularly limited to these.

Moreover, it is possible to use, as the anion polymerization, the group transfer process using a compound such as ketenesilylacetal, rather than using the living radical polymerization.

An organic solvent usable in the solution polymerization is not particularly limited. It is possible to use one or more kinds of the following substances including: hydrocarbon-based solvents such as toluene, hexane, etc.; alcohol-based solvents such as methanol, isopropanol, etc.; ketone-based solvents such as methyl ethyl ketone, methyl isobutyl ketone, etc.; ester-based solvents such as ethyl acetate, butyl acetate, etc.; ether-based solvents such as tetrahydrofuran, dioxane, etc.; glycol-based solvents such as methoxyethanol, diethylene glycol monobutyl ether, diethylene glycol dimethyl ether, propylene glycol monomethyl ether, propylene glyhcol monomethyl ether acetate, etc.; amide-based solvents such as N-methyl pyrrolidone, dimethyl acetamide, etc.; carbonate-based solvents such as ethylene carbonate, propylene carbonate, etc.; urea-based solvents such as tetramethylurea, dimethyl imidazolidinone, etc.; halogen-based solvents such as dimethylsulfoxide, methylene chloride, etc. Using a glycol-based solvent which is added to the ink-jet ink is particularly preferred because after the solution polymerization is performed, a resultant solution can be used for pigment dispersion as it is. In a case that any other solvent which is not suitable (preferred) for the ink-jet ink is used, it is necessary that the polymer is taken out of the solvent. The method for taking out the polymer is not particularly limited, and may include drying; allowing the polymer to be deposited in a poor solvent; and adding alkaline water after the polymerization to neutralize, thereby to obtain an aqueous solution of the polymer, and then adding an acid to allow the polymer to be deposited, etc.

The polymer obtained in the above-described manner is solubilized to water by neutralizing the acidic group of the polymer. As described above, it is allowable to add an alkaline aqueous solution after the solution polymerization so as to neutralize the acidic group and to perform ionization, thereby obtaining an aqueous solution of the polymer; alternatively, it is allowable to take out the polymer as described above and to mix an alkaline aqueous solution with the taken out polymer so as to dissolve the polymer in the alkaline aqueous solution. In such a manner, it is possible to obtain a pigment dispersant.

A liquid pigment dispersion used in an ink related to the present teaching will be explained. The liquid pigment dispersion related to the present teaching is composed, at least, of a pigment, a pigment dispersant neutralized by an alkali, and water. Further, there is no particular limitation to the usage of water, and it is possible to use a water-soluble organic solvent or a mixture thereof, as necessary.

The water-soluble organic solvent is not particularly limited, and any water-soluble organic solvent may be used. The water-soluble organic solvent can be exemplified, for example, by: alkyl alcohols having 1 to 4 carbons such as methyl alcohol, ethyl alcohol, n-propyl alcohol, isopropyl alcohol, n-butyl alcohol, sec-butyl alcohol, tert-butyl alcohol, etc.; alkylene glycols in which an alkylene group has 2 to 6 carbon atoms such as ethylene glycol, propylene glycol, butylene glycol, triethylene glycol, 1,2,6-hexanetriol, thio-diglycol, hexylene glycol, diethylene glycol, etc.; glycerol; lower alkyl ethers of alkylene glycols such as ethylene glycol monomethyl (or ethyl, propy, butyl) ether, diethylene glycol monomethyl (or ethyl, propyl, butyl) ether, triethylene glycol monomethyl (or ethyl, propyl, butyl, hexyl) ether, tetraethylene glycol monomethyl (or ethyl, propyl, butyl, hexyl) ether, propylene glycol monomethyl (or ethyl, propyl, butyl) ether, dipropylene glycol monomethyl (or ethyl, propyl, butyl) ether, tripropylene glycol monomethyl (or ethyl, propyl, butyl) ether, tetrapropylene glycol monomethyl (or ethyl) ether, etc.; N-methyl-2-pyrrolidone; 2-pyrrolidone; 1,3-dimethyl-2-imidazolidinone; etc. Among these substances, it is preferable to use the alkylene glycols and lower alkyl ethers thereof.

Next, the amount of the pigment dispersant relative to the amount of the pigment is not particularly limited, and is in a range of 5 parts by mass to 100 parts by mass relative to 100 parts by mass of the pigment. In a case that the amount of the pigment dispersant is less than 5 parts by mass, the amount of the dispersant is not sufficient, which leads to insufficient dispersibility and stability of the pigment; in a case that the amount of the pigment dispersant is more than 100 parts by mass, there would be any dispersant which does not adsorb to the pigment, which leads to any increased viscosity and/or unsatisfactory discharging stability, and promotes the penetration into paper, resulting in lowered chromogenic property. The amount of the pigment dispersant is more preferably in a range of 10 parts by mass to 50 parts by mass, further more preferably in a range of 20 parts by mass to 45 parts by mass.

The additive amount of water or solvent, etc. can be adjusted depending on the drying property of the ink on a printed matter, the viscosity of the ink, etc.

Further, the concentration of the pigment in the liquid pigment dispersion is arbitrary, and is not particularly limited. Specifically, the pigment concentration is in a range of 5% by mass to 30% by mass, more preferably in a range of 10% by mass to 20% by mass.

Furthermore, a various kinds of additives are used as necessary, but there is no particular limitation to the additive(s). Specifically, it is possible to use, as the additive(s), viscosity-adjusting agents, pH-adjusting agents, fungicides, levelling agents, antifoaming agents, ultraviolet absorbers, light stabilizers, antioxidants, surface tension-adjusting agents, drying preventing agents for nozzle, and further water-insoluble organic solvents, polymer components such as emulsion, surfactants, dyes, etc.

The pigment is dispersed by using the above-described raw materials. The liquid pigment dispersion can be obtained by adding the pigment, the dispersant, liquid medium and additive(s), and by dispersing the pigment by any conventionally known method. Alternatively, it is also possible to process the pigment in advance with the dispersant to obtain a polymer-treated pigment, and then to disperse the treated pigment to thereby obtain the pigment dispersion.

A method for producing the polymer-treated pigment will be explained. Any conventionally known method can be used as the method for obtaining the polymer-treated pigment, and there is no particular limitation to the method. Specific examples of the method include: a method in which a pigment, preferably aqueous paste of pigment, is used, to be mixed, in water, with a dispersant neutralized by an alkali and dissolved in water, then an acid is added to allow the polymer to be deposited; a method in which powdery pigment is mixed with a polymer organic solvent which is not neutralized by an alkali, followed by being kneaded by a three-roll mill or a kneader as necessary, and a resultant mixture is added to a poor solvent so as to allow the polymer-treated pigment to be deposited; and the like.

At first, the pigment, the dispersant, and the liquid medium are mixed, and dispersed by a conventionally known method. The dispersion includes a pre-dispersion and a main dispersion. When performing the pre-dispersion, it is possible to use a common dissolver, however, it is also possible to use a high-speed mixer such as homogenizer, etc. As the high-speed mixer, it is preferable to use a T.K. HOMOMIXER (product name), T.K. ROBOMIX (product name), and T.K. FILMIX (product name) manufactured by PRIMIX Corporation; Cleamix (trade name) manufactured by M Technique Co., Ltd.; and Ultra Despa (trade name) manufactured by Asada Iron Works Co., Ltd., etc.

Next, when performing a main dispersion, it is possible to use, other than the kneader, a two-roll mill, and the three-roll mill, for example: kneaders such as SS5 (product name; manufactured by M TECHNIQUE CO., LTD.), Miracle KCK (product name; manufactured by ASADA IRON WORKS. CO., LTD.), etc.; ultrasonic dispersion apparatuses; high-pressure homogenizers such as Micro-fluidizer (product name; manufactured by MIZUHO INDUSTRIAL CO., LTD.); dispersing apparatuses such as Nanomizer (product name; manufactured by YOSHIDA KIKAI CO., LTD.), Star Burst (product name; manufactured by SUGINO MACHINE LIMITED), G-Smasher (product name; manufactured by RIX CORPORATION); and the like. Further, it is also possible to use a ball mill using bead media such as glass and/or zircon, a sand mill, a horizontal media mill dispersing apparatus, a colloid mill, etc.

Further, regarding the polymer-treated pigment, pre-dispersion as described above and the main dispersion are performed by mixing the polymer-treated pigment, the liquid medium and the alkali. In the polymer-treated pigment, the acid group is not neutralized by the alkali, and thus the alkali is added to neutralize the acid group in the dispersant so that the acid group is dispersed in the water.

Furthermore, a method in which the pigment and an organic solvent solution of the polymer which is not neutralized are mixed and kneaded by a three-roll mill, etc., and then are added with the alkali, followed by removing the organic solvent; or a method in which the pigment, an organic solvent solution of the polymer which is not neutralized, and an alkaline aqueous solution are mixed and kneaded, followed by removing the organic solvent may be also used to perform the dispersion in a similar manner; and there is no particular limitation to the method of performing the dispersion. In particular, these methods are suitable for a dispersant of which acid value is small and of which solubility to water is not satisfactory.

Although the obtained liquid pigment dispersion can be used as it is for preparing the water-based ink, it is also preferred that a centrifugal machine, an ultra-centrifugal machine or a filter is used to remove any coarse particles which can be present in a small amount in the liquid pigment dispersion. The coarse particles accumulate as sediments in a water-based pigment ink for ink-jet recording (printing), in some cases. Further, since the coarse particles might cause any clogging of nozzles in ink-jet recording, the content rate of the coarse particles is preferably small.

Regarding the physical property of the obtained liquid pigment dispersion, it is desired that the pigment has a particle diameter in a range of 80 nm to 140 nm, more preferably in a range of 90 nm to 130 nm, in view of the clogging of nozzle during printing. With respect to the physical properties such as the viscosity, surface tension, pH, etc., are not particularly limited, and each may be in any range. Considering the utilization ratio, etc., examples of the range of the viscosity (at 25° C.) include, for example, a range of 1 mPa·s to 100 mPa·s, preferably in a range of 2 mPa·s to 20 mPa·s, etc.; the viscosity (at 25° C.) may be adjusted depending on the required pigment concentration, pigment usage, etc., and is not particularly limited.

As the EO group-including anionic surfactant, any anionic surfactant including an EO group may be used. The EO group-including anionic surfactant preferably contains at least one of a compound represented by the following formula (1) and a compound represented by the following formula (2):

$$R^1-O-(C_2H_4O)_m-SO_3M \qquad (1)$$

wherein in the formula (1), $R^1$ is a straight-chain alkyl group of which number of carbon atoms is 4 to 18;

m is 2 to 18; and

M is an alkali metal, alkali earth metal, ammonium or alkanol amine;

$$R^2-O-(C_2H_4O)_n-CH_2COOM \qquad (2)$$

wherein in the formula (2), $R^2$ is a straight-chain alkyl group of which number of carbon atoms is 4 to 18;

n is 2 to 5; and

M is an alkali metal, alkali earth metal, ammonium or alkanol amine.

In view of suppressing the occurrence of any warping (bending) of recording during continuous recording and in view of preventing the occurrence of white void having a pinhole shape during continuous recording, m is preferably in a range of m=2 to 17 in the formula (1), more preferably in a range of m=2 to 3, and further more preferably m=3. Further, for a similar reason, $R^1$ is preferably a straight-chain alkyl group of which number of carbon atoms is 12 or 13. Further, in view of suppressing the occurrence of any warping of recording during continuous recording, the EO group-including anionic surfactant contains the compound represented by the formula (1).

As the EO group-including anionic surfactant, it is allowable to use for example, a commercially available product. The commercially available product is exemplified, for example, by "SUNNOL (trade name) NL-1430" (a compound represented by the formula (1), wherein m=3, and $R^1$ is a straight-chain alkyl group of which number of carbon atoms is 12 or 13) and "ENAGICOL (trade name) EC-30" (a compound represented by the formula (2), n=3) produced by LION CORPORATION; "HITENOL (trade name) 330T" (a compound represented by the formula (1), m=3) produced by DAI-ICHI KOGYO SEIYAKU CO. LTD.; "SANDET (trade name) EN" (a compound represented by the formula (1), m=2) and "SANDET (trade name) END" (a compound represented by the formula (1), m=3), produced by SANYO CHEMICAL INDUSTRIES, LTD.; "LATEMUL (trade name) E-118B" (a compound represented by the formula (1), m=18), produced by KAO CORPORATION; and the like. It is allowable to use one kind of these EO group-including anionic surfactants, or to use two or more kind of these EO group-including anionic surfactants in combination.

The blending amount of the EO group-including anionic surfactant in the entire amount of the water-based ink may be, for example, not more than 5% by weight, in a range of 0.1% by weight to 3% by weight, or in a range of 0.14% by weight to 1.96% by weight. By allowing the blending amount of the EO group-including anionic surfactant be within the above-described range, it is possible to further suppress the occurrence of the warping (bending) of recording and white void of pinhole shape during the continuous recording.

As the EO group-including nonionic surfactant, although any nonionic surfactant including an EO group may be used, in view of suppressing the occurrence of white void of pinhole shape and improving the chromaticness, it is preferred to use a compound represented by the following formula (3), namely, an acetylene glycol-based nonionic surfactant.

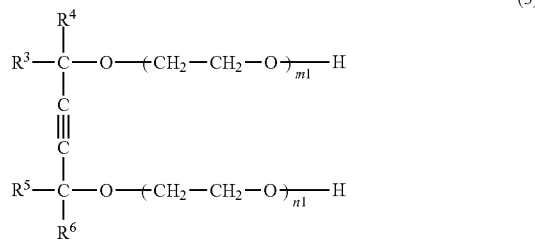

In the formula (3), m1 and n1 may be same with each other or different from each other, and are numbers satisfying: m1+n1=1 to 15, preferably satisfying m1+n1=3 to 11, and more preferably satisfying m1+n1=4 to 6. In the formula (3), $R^3$, $R^4$, $R^5$ and $R^6$ may be same with one another or different from one another, and each of $R^3$, $R^4$, $R^5$ and $R^6$ is a straight-chain or branched-chain alkyl group. Each of $R^3$, $R^4$, $R^5$ and $R^6$ can be exemplified, for example, by a methyl group, an ethyl group, an n-propyl group, an isopropyl group, a n-butyl group, an isobutyl group, etc.

In view of further suppressing the occurrence of white void of pinhole shape and further improving the chromaticness, it is preferred that in the Formula (3), m1+n1=4 and each of $R^3$ and $R^5$ is a methyl group and each of $R^4$ and $R^6$ is an isobutyl group. The EO group-containing nonionic surfactant having such a construction has a high defoaming property and has a strong tendency that the surfactant makes the water-based ink spread laterally on the recording medium (in a direction of the recording plane (surface) of the recording medium). With this, it is presumed that the occurrence of white void of pinhole shape is suppressed and the chromaticness is improved.

It is allowable to use, for example, a commercially available product as the EO group-including nonionic surfactant. The commercially available product is exemplified, for example, by "OLFIN (trade name) E1014" (acetylene glycol-EO adduct, m1+n1=4), "OLFIN (trade name) E1006" (acetylene glycol-EO adduct, m1+n1=6), and "OLFIN (trade name) E1010" (acetylene glycol-EO adduct, m1+n1=10), produced by NISSHIN KAGAKU KOGYO KK; and the like. It is allowable to singly use one kind of these nonionic surfactants, or to use two or more kind of these nonionic surfactants in combination.

The blending amount of the EO group-including nonionic surfactant in the entire amount of the water-based ink may be, for example, not more than 2% by weight, in a range of 0.1% by weight to 1% by weight, or in a range of 0.2% by weight to 0.4% by weight. By allowing the blending amount of the EO group-including nonionic surfactant be within the above-described range, it is possible to further suppress the occurrence of white void of pinhole shape during the continuous recording and further improving the chromaticness of a printed matter.

In view of suppressing the occurrence of the white void having the pinhole shape during the continuous recording and improving the chromaticness, the water-based ink preferably contains both of the EO group-including anionic surfactant and the EO group-including nonionic surfactant.

In the water-based ink, the weight ratio between the EO group-including anionic surfactant (A) and the EO group-including nonionic surfactant (N), namely, the weight ratio (A/N) of the EO group-including anionic surfactant (A) relative to the EO group-including nonionic surfactant (N) is, for example, in a range of A/N=0.5 to 12.0, in a range of A/N=0.7 to 9.8, or in a range of A/N=2.8 to 6.1. By allowing the weight ratio (A/N) be within the above-described range, it is possible to further suppress the occurrence of the warping (bending) of recording and white void of pinhole shape during the continuous recording, and the re-dissolvability of the water-based ink is further improved.

Owing to the pigment dispersant and at least one of the EO group-including anionic surfactant and the EO group-including nonionic surfactant which are contained in the water-based ink, it is considered that the hydrophilicity due to the EO group is imparted to the water-based ink, that the occurrence of the warping (bending) of recording and white void having a pinhole shape during continuous recording can be suppressed, and that the water-based ink is allowed to have an excellent re-dispersibility. Further, the mechanism of suppressing the occurrence of warping of recording during continuous recording is presumed, for example, as follows. Namely, in an ink-jet recording using a conventional water-based pigment ink, it is presumed that any warping of recording during continuous recording occurs due to a pigment dispersant freed from the pigment is firmly fixed to a portion or location, of an ink-jet head, in the vicinity of nozzles due to drying of the water-based pigment ink, which in turn bends a flying direction of ink droplets. In contract, the water-based ink related to the present teaching is allowed to contain at least one of the EO group-including anionic surfactant and the EO group-including nonionic surfactant; owing to this composition, the dispersing stability of the pigment dispersant including the EO chain is further enhanced. It is presumed that the steric repulsion of the EO chain in the pigment dispersant, and the steric repulsion of the EO chain composed of the EO group of the anionic surfactant and/or the EO group of the nonionic surfactant contribute to the dispersing stability. Further, even if the pigment dispersant freed from the pigment is solidified due to drying of the water-based ink, the pigment dispersant can be re-dissolved to the water-based ink since the water-based ink is allowed to contain at least one of the EO group-including anionic surfactant and the EO group-including nonionic surfactant which have high mutual solubility with the pigment dispersant, thereby suppressing any firm fixation of the pigment dispersant to a portion in the vicinity of the nozzles, and suppressing the occurrence of the bending of recording during continuous recording. This mechanism, however, is merely a presumption, and the present teaching is not limited to and restricted by this presumed mechanism.

The water-based ink may further contain glycol ether including an EO group (hereinafter referred to as "EO group-including glycol ether", in some cases). By allowing the water-based ink to contain the EO group-including glycol ether, it is possible to more suitably suppress the occurrence of bending of recording during continuous recording. This mechanism is presumed, for example, as follows. Namely, in an ink-jet recording using a conventional water-based pigment ink, it is presumed that any bending of recording during continuous recording occurs due to evaporation of the water in the water-based pigment ink in a portion or location, of an ink-jet head, in the vicinity of the nozzles during the continuous recording, which in turn increases the concentration of pigment to be high locally in the vicinity of the nozzles, thereby lowering the dispersing stability of the pigment. In contract, the water-based ink related to the present teaching is allowed to contain the pigment dispersant including the EO chain and the EO group-including glycol ether as described above; owing to this composition, it is presumed that the steric hindrance is imparted by the EO group-including glycol ether to the pigment dispersant, which in turn enhances the dispersing stability of the pigment, thereby suppressing the occurrence of the bending of recording during continuous recording. This mechanism, however, is merely a presumption, and the present teaching is not limited to and restricted by this presumed mechanism.

The EO group-including glycol ether is preferably a glycol mono ether. Further, the EO group-including glycol ether is preferably a compound represented by the following formula (4).

$$HO(CH_2CH_2O)_{n2}R^7 \quad (4)$$

In the formula (4), n2=1 to 3, and $R^7$ is a straight chain or branched chain alkyl group of which number of carbon atoms is 1 to 6.

As the EO group-including glycol ether, it is allowable to use any glycol ether provided that the glycol ether includes an EO group. The EO group-including glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, etc.

Among the above-described substances, triethylene glycol-n-butyl ether is preferred. It is allowable to singly use one kind of these EO group-including glycol ethers, or to use two or more kind of these EO group-including glycol ethers in combination.

The blending amount of the EO group-including glycol ether in the entire amount of the water-based ink may be, for example, not more than 10% by weight, not more than 8% by weight, or in a range of 2% by weight to 6% by weight. By allowing the blending amount of the EO group-including glycol ether be within the above-described range, it is possible to further suppress the occurrence of the warping (bending) of recording during the continuous recording.

The water-based ink preferably satisfies the following condition (I). By satisfying the condition (I), it is possible to further suppress the occurrence of the warping (bending) of recording and white void of pinhole shape during the continuous recording, and the re-dissolvability of the water-based ink and the chromaticness of a recorded matter are further improved.

$$2 \leq (S+G)/R \leq 5 \quad \text{Condition(I):}$$

wherein in the condition (I),

S: the blending amount (% by weight) of at least one of the EO group-including anionic surfactant and the EO group-including nonionic surfactant in the entire amount of the water-based ink;

G: the blending amount (% by weight) of the EO group-including glycol ether in the entire amount of the water-based ink; and R: the blending amount (% by weight) of the pigment dispersant in the entire amount of the water-based ink.

Here, the phrase "the blending amount (% by weight) of at least one of the EO group-including anionic surfactant and the EO group-including nonionic surfactant in the entire amount of the water-based ink" means that, in a case that the water-based ink contains only either one of the EO group-including anionic surfactant and the EO group-including nonionic surfactant, the blending amount of either one of the EO group-including anionic surfactant and the EO group-including nonionic surfactant; on the other hand, in a case that the water-based ink contains both of the EO group-including anionic surfactant and the EO group-including nonionic surfactant, the phrase means the total blending amount of the EO group-including anionic surfactant and the EO group-including nonionic surfactant.

In view of suppressing viscosity increase of the water-based ink, it is preferred that each of the EO group-including anionic surfactant, the EO group-including nonionic surfactant, and the EO group-including glycol ether contains an EO chain composed of two or three of the EO groups. By allowing these compounds to contain EO chains, respectively, having similar lengths to one another, it is presumed that the mutual solubility among these compounds is enhanced, thereby making it possible to allow the pigment dispersant, having similar structure to these compounds, to be further easily re-dissolved in the water-based ink.

The water-based ink may further contain a water-soluble organic solvent which is different from the EO group-including glycol ether. The water-soluble organic solvent is exemplified, for example, by a humectant which prevents the water-based ink from drying at an end of a nozzle in an ink-jet head, a penetrant which adjusts the drying velocity on a recording medium, etc.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, trimethylolethane, 1,2-ethanediol, 1,2-propanediol, 1,2-butanediol, 1,2-pentanediol, 1,2-hexanediol, 1,2,4-butanetriol, 1,2,5-pentanetriol, 1,2,6-hexanetriol, etc.; 2-pyrrolidone; N-methyl-2-pyrrolidone; 1,3-dimethyl-2-imidazolidinone; and the like. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that only one kind of the humectants as described above is used singly, or two or more kinds of the humectants are used in combination. Among the above-described humectants, it is preferable to use polyvalent alcohols such as alkylene glycol, glycerol, etc. Further, in view of improving the chromaticness, it is preferable to use tripropylene glycol as the humectant. Furthermore, it is also preferred that glycerol and tripropylene glycol are used in combination, as the humectant.

The blending amount of the humectant in the entire amount of the water-based ink is, for example, in a range of 0% by weight to 95% by weight, in a range of 5% by weight to 80% by weight, or in a range of 5% by weight to 50% by weight.

The penetrant is exemplified, for example, by glycol ethers which are different from the EO group-including glycol ether. The glycol ethers which are different from the EO group-including glycol ether are exemplified, for example, by propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. It is allowable that only one kind of the penetrants as described above is used singly, or two or more kinds of the penetrants are used in combination.

The blending amount of the penetrant in the entire amount of the water-based ink is, for example, in a range of 0% by weight to 20% by weight, in a range of 0% by weight to 15% by weight, or in a range of 1% by weight to 4% by weight.

The water-based ink may further contain any known additive, as necessary. The additive is exemplified, for example, by surfactants, pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc.

The water-based ink can be prepared, for example, by uniformly mixing the pigment, the pigment dispersing resin, at least one of the EO group-including anionic surfactant and the EO group-including nonionic surfactant, water, and optionally other additive(s) as necessary, by a conventionally known method, and then removing any non-dissolved matter, etc., with a filter, etc. Note that the above-described method for preparing the water-based ink may include the above-described step for preparing the liquid pigment dispersion.

As explained above, the water-based ink for ink-jet recording related to the present teaching contains the pigment, the pigment dispersing resin including the ethylene oxide chain; and at least one of the anionic surfactant including the ethylene oxide group and the nonionic surfactant including the ethylene oxide group, thereby making it possible to realize improved discharging stability during continuous recording and excellent re-dispersibility, as well.

Next, an ink cartridge related to the present teaching is characterized by being an ink cartridge containing a water-based ink for ink-jet recording; wherein the water-based ink is the water-based ink for ink-jet recording related to the present teaching. For example, any conventionally known main body (body) of an ink cartridge can be used as the main body of the ink cartridge related to the present teaching.

Next, explanation will be given about an ink-jet recording apparatus and an ink-jet recording method related to the present teaching.

The ink-jet recording apparatus related to the present teaching is an ink-jet recording apparatus characterized by including: an ink accommodating section configured to accommodate an ink therein; and an ink discharge mechanism configured to discharge the ink accommodated in the ink accommodating section; wherein the ink accommodated in the ink accommodating section is the water-based ink for ink-jet recording related to the present teaching.

The ink-jet recording method related to the present teaching is an ink-jet recording method characterized by including: performing recording on a recording medium by discharging, to the recording medium, a water-based ink by an ink-jet system; and using the water-based ink for ink-jet recording related to the present teaching, as the water-based ink.

The ink-jet recording method related to the present teaching can be practiced, for example, by using the ink-jet recording apparatus related to the present teaching. The recording includes printing a letter (text), printing an image, printing, etc.

FIGURE depicts the configuration of an example of the ink-jet recording apparatus related to the present teaching. As depicted in FIGURE, an ink-jet recording apparatus 1 related to the present teaching includes four ink cartridges 2, an ink discharge mechanism (ink-jet head) 3, a head unit 4, a carriage 5, a driving unit 6, a platen roller 7 and a purge device 8 as main constitutive components or parts.

The four ink cartridges 2 contain four colors of water-based inks, respectively, the four colors being yellow, magenta, cyan and black. At least one water-based ink among the four color water-based inks is the water-based ink for ink-jet recording related to the present teaching. The ink-jet head 3 disposed on the head unit 4 performs recording on a recording medium (for example, recording paper or recording sheet) P. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398). The platen roller 7 extends in the reciprocating direction of the carriage 5 and is arranged to face or be opposite to the ink-jet head 3.

The purge device 8 sucks or draws unsatisfactory ink (poor ink) which contains air bubbles, etc. accumulated or trapped in the inside of the ink-jet head 3. As the purge device 8, it is possible to use, for example, a conventionally known purge device (for example, see Japanese Patent Application laid-open No. 2008-246821 corresponding to United States Patent Application Publication No. US2008/0241398).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIGURE, a cap 18 is provided to cover a plurality of nozzles of the ink-jet head 3 which is returned to a reset position upon completion of the recording, so as to prevent the water-based inks from drying.

In the ink-jet recording apparatus 1 related to the present embodiment, the four ink cartridges 2 are provided, together with the head unit 4, on one carriage 5. However, the present teaching is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, each of the four ink cartridges 2 and the head unit 4 which is provided on the carriage 5 are connected with a tube, etc., and the water-based inks are supplied from the four cartridges 2, respectively, to the head unit 4 via the tubes.

Ink-jet recording using the ink-jet recording apparatus 1 is performed, for example, in the following manner. Namely, at first, a recording paper P is supplied or fed, for example, from a paper feeding cassette or sheet feeding cassette (not depicted in the drawing) arranged at a side of or at a position below the ink-jet recording apparatus 1. The recording paper P is introduced or guided between the ink-jet head 3 and the platen roller 7. Then, a predetermined recording is performed on the fed or introduced recording paper P with the water-based ink(s) discharged or jetted from the ink-jet head 3. Since the water-based ink related to the present teaching is excellent in the re-dispersibility, the water-based ink can be discharged stably from the ink-jet head 3, and the occurrence of any warping (bending) of recording and white void(s) having a pinhole shape during continuous recording can be suppressed. The recording paper P after the recording is discharged from the ink-jet recording apparatus 1. In FIGURE, the paper feeding mechanism and paper discharge mechanism for the recording paper P are omitted in the drawing.

In the apparatus depicted in FIGURE, an ink-jet head of serial type (serial type ink-jet head) is adopted. However, the present teaching is not limited to this. The ink-jet recording apparatus may be an apparatus adopting an ink-jet head of line type (line type ink-jet head).

EXAMPLES

Next, examples related to the present teaching will be explained together with comparative examples. Note that the present teaching is not limited to and is not restricted by the examples and the comparative examples which will be described below.

Preparation Example 1

<Preparation of Liquid Dispersion of Water-Based Pigment of Magenta Color>

200 parts of C.I. Pigment Red 122 as a magenta pigment; 175 parts of an aqueous solution of a neutralized product (solid content: 40%) of copolymer of styrene/methyl methacrylate/methacrylic acid 2-ethylhexyl/polyethylene glycol monomethacrylate (molecular weight: 350)/methacrylic acid (mass ratios: 20/20/20/20/20; number-average molecular weight: 13000) neutralized by potassium hydroxide, as a pigment dispersing agent 1; and 425 parts of water, as a liquid medium were blended, deflocculated (peptized) with a dispersing apparatus, and thus a pre-mill base was prepared. Then, the pre-mill base was subjected to a dispersing process with a horizontal media mill dispersing apparatus "Dyno-Mill 0.6 Liter ECM Type" (product name; manufactured by SHINMARU ENTERPRISES CORPORATION; diameter of zirconia beads: 0.5 mm), at a peripheral speed of 10 m/s. After performing the dispersion for 2 hours, the dispersion was ended, and thus a mill base was obtained.

The obtained mill base was diluted by an ion-exchange water so that the pigment content was 15% by weight, followed by being subjected to centrifugation; a resultant liquid pigment dispersion was filtrated through a membrane filter (pore size: 10 μm), then the ion-exchange water, an antiseptic agent and glycerol were added each in a predetermined amount to the filtered liquid pigment dispersion, and thus a liquid magenta-color pigment dispersion of which pigment concentration was 12% by weight was obtained.

The average particle diameter of the liquid pigment dispersion was measured (at 25° C.) by a particle size measuring apparatus "NICOMP 380ZLS-S" (product name; manufactured by PARTICLE SIZING SYSTEMS PSS), and the average particle size was 123 nm. In the liquid pigment dispersion, the viscosity was 4.96 mPa·s (at 25° C.), the surface tension was 46.5 mN/m (at 25° C.), and the pH was 9.4 (at 25° C.). The composition and the results of physical properties of the liquid magenta-color pigment dispersant are indicated in TABLE 1 below.

Preparation Example 2

<Preparation of Liquid Dispersion of Water-Based Pigment of Cyan Color>

A liquid cyan-color pigment dispersion was obtained in a similar manner as in Preparation Example 1, except that C.I. Pigment Blue 15:3 as a cyan pigment was used instead of using the magenta pigment used in Preparation Example 1, and that an aqueous solution of a neutralized product (solid content: 40%) of copolymer of styrene/methyl methacrylate/methacrylic acid 2-ethylhexyl/polyethylene glycol monomethacrylate (molecular weight: 350)/methacrylic acid (mass ratios: 30/20/20/15/15; number-average molecular weight: 15000) neutralized by lithium hydroxide was used, as a pigment dispersant 2, instead of using the pigment dispersant 1 used in Preparation Example 1. The composition and the results of physical properties of the liquid cyan-color pigment dispersant are indicated in TABLE 1 below, together with those regarding Preparation Example 1.

Preparation Example 3

<Preparation of Liquid Dispersion of Water-Based Pigment of Yellow Color>

A liquid yellow-color pigment dispersion was obtained in a similar manner as in Preparation Example 2, except that C.I. Pigment yellow 74 as a yellow-color pigment was used instead of using the cyan pigment used in Preparation Example 2. The composition and the results of physical properties of the liquid yellow-color pigment dispersant are indicated in TABLE 1 below.

Preparation Example 4

<Preparation of Liquid Dispersion of Water-Based Pigment of Magenta Color>

20% by weight of a pigment (C.I. Pigment Red 122) and 7% by weight of a neutralized product of copolymer of styrene/acrylic acid (acid value: 175, molecular weight: 10000) neutralized by sodium hydroxide were added with pure water (or purified water) so that the entire amount thereof was 100% by weight, followed by being agitated and mixed, and thus a mixture was obtained. The obtained mixture was placed in a wet sand mill charged with zirconia beads of which diameter was 0.3 mm, and was subjected to a dispersing process for 6 hours. Afterwards, the zirconia beads were removed by a separator, and the obtained mixture was filtrated through a cellulose acetate filter (pore size 3.00 μm). Thus, a liquid pigment dispersant 4 was obtained.

TABLE 1

| | | Preparation Example | | |
|---|---|---|---|---|
| | | 1 | 2 | 3 |
| | Liquid pigment dispersion | Liquid pigment dispersion of magenta color | Liquid pigment dispersion of cyan color | Liquid pigment dispersion of yellow color |
| Pre-Mill Base | Pigment used | 200 parts of C.I. Pigment Red 122 | 200 parts of C.I. Pigment Blue 15:3 | 200 parts of C.I. Pigment Yellow 74 |
| | Dispersant used | Pigment dispersant 1 | Pigment dispersant 2 | Pigment dispersant 2 |
| | Acid value of dispersant (mgKOH/g) | 130 | 98 | 98 |
| | Amount of dispersant | 175 parts | 200 parts | 125 parts |
| | Water | 425 parts | 400 parts | 475 parts |
| Physical Properties | Average particle diameter (nm) | 123 | 98 | 107 |
| | Viscosity (mPa · s) | 4.96 | 4.64 | 2.74 |
| | Surface tension (mN/m) | 46.5 | 39.8 | 41.8 |
| | pH | 9.4 | 8.9 | 8.7 |

As a storing stability test, TABLE 2 below indicates the changes in particle diameter and viscosity after the liquid dispersions of water-based pigments of the respective colors were allowed to stand still at 70° C. for one week. As the stability, the rate of change (%) in each of the particle diameter and the viscosity in a case that each of the liquid dispersions of the water-based pigments of the respective colors was allowed to stand still at 70° C. for seven days. The rate of change is indicated as the percentage (%) of (value measured after 7 days)/(initial value)−1. In each of the liquid dispersions of water-based pigments, no changes were observed both in the particle diameter and the viscosity, and the storing stability was satisfactory.

TABLE 2

| | Average Particle Diameter (nm) | | | | Viscosity (mPa · s) | | | |
|---|---|---|---|---|---|---|---|---|
| | Initial state | After 7 days | Rate of change | Evaluation | Initial state | After 7 days | Rate of change | Evaluation |
| Preparation Example 1 | 123 | 123 | 0% | A | 4.96 | 4.88 | −2% | A |
| Preparation Example 2 | 98 | 97 | −1% | A | 4.64 | 4.45 | −4% | A |
| Preparation Example 3 | 107 | 106 | −1% | A | 2.74 | 2.67 | −3% | A |

<Evaluation Criterion>

The evaluation was made based on the following evaluation criterion.

(Changes in the Particle Diameter and Viscosity)

A: The rate of change was less than ±5%.

B: The rate of change was in a range of not less than ±5% to less than ±10%.

C: The rate of change was not less than ±10%.

Examples 1-1 to 1-9 and Comparative Examples 1-1 to 1-4

Examples 1-1 to 1-9 are examples in which the kind and/or the blending amount of the EO group-including anionic surfactant or the EO group-including nonionic surfactant was/were changed. Components, except for the liquid pigment dispersion, which were included in Water-Based Ink Composition (TABLE 3) as indicated below were mixed uniformly or homogeneously; and thus an ink solvent was obtained. Subsequently, the ink solvent was added to the liquid pigment dispersant, followed by being mixed uniformly. After that, the obtained mixture was filtrated through a cellulose acetate membrane filter (pore size 3.00 μm) produced by TOYO ROSHI KAISHA, LTD., and thus a water-based ink for ink-jet recording of each of Examples 1-1 to 1-9 and Comparative Examples 1-1 to 1-4 was obtained. Further, a water-based ink for ink-jet recording for Reference Example 1-1 as a control for the evaluations of chromaticness (color) of each of Examples 1-1 to 1-9 and Comparative Examples 1-3 and 1-4, and a water-based ink for ink-jet recording for Reference Example 1-4 as a control for the evaluations of chromaticness (color) of each of Comparative Examples 1-1 and 1-2 were obtained in a similar manner as those for obtaining the water-based inks of Examples 1-1 to 1-9 and Comparative Examples 1-1 to 1-4.

With respect to the water-based inks of Examples 1-1 to 1-9 and Comparative Examples 1-1 to 1-4, (a) evaluation of occurrence of warping (bending) of recording during continuous recording, (b) evaluation of occurrence of white void having a pinhole shape during continuous recording, (c) evaluation of re-dispersibility, and (d) evaluation of chromaticness (color) were performed by the following methods.

(a) Evaluation of Occurrence of Warping (Bending) of Recording During Continuous Recording An ink-jet printer "MFC-J4510N" manufactured by BROTHER KOGYO KABUSHIKI KAISHA was used to record an image, including 100 pieces of a one-dot ruled line, continuously on 500 sheets of a plain paper (plain paper "4200" produced by XEROX CORPORATION), under the conditions with a resolution of 600 dpi×300 dpi, by using each of the water-based inks of Examples 1-1 to 1-9 and Comparative Examples 1-1 to 1-4, in an environment wherein the temperature was 35° C. and the relative humidity was 80%. Thus, evaluation samples were produced. Further, the ink-jet head was removed from the ink-jet printer MFC-J4510N, and a portion, of the ink-jet head, in the vicinity of the nozzles was observed by using an optical microscope (magnification: ×1000), and evaluations were made for the water-based ink of each of Examples 1-1 to 1-9 and Comparative Examples 1-1 to 1-4, based on the following evaluation criterion. Note that a water-based ink can be judged to have an excellent discharging stability during continuous recording, provided that the occurrence of bending of recording is suppressed during the continuous recording.

<Evaluation Criterion for Occurrence of Warping (Bending) of Recording During Continuous Recording>

AA: There was no bending of recording in the one-dot ruled lines and no adhered matter was observed in the vicinity of the nozzles.

A: There was no bending of recording in the one-dot ruled lines, but an adhered matter was observed in the vicinity of the nozzles.

B: The number of bending of recording occurring in the one-dot ruled lines was in a range of not less than 1 line to less than 5 lines, and an adhered matter was observed in the vicinity of the nozzles.

C: The number of bending of recording occurring in the one-dot ruled lines was not less than 5 lines.

(b) Evaluation of Occurrence of White Void Having Pinhole Shape During Continuous Recording The ink-jet printer "MFC-J4510N" was used to record an image, including a single color solid patch, continuously on 10 sheets of a plain paper (plain paper "4200" produced by XEROX CORPORATION), under the conditions with a resolution of 600 dpi×300 dpi, by using each of the water-based inks of Examples 1-1 to 1-9 and Comparative Examples 1-1 to 1-4, in an environment wherein the temperature was 35° C. and the relative humidity was 80%. Thus, evaluation samples were produced. Then, evaluations were made for the water-based ink of each of Examples 1-1 to 1-9 and Comparative Examples 1-1 to 1-4, based on the following evaluation criterion. Note that a water-based ink can be judged to have an excellent discharging stability during continuous recording, provided that the occurrence of white void having the pinhole shape is suppressed during the continuous recording.

<Evaluation Criterion for Evaluation of Occurrence of White Void Having Pinhole Shape During Continuous Recording>

AA: No white void having pinhole shape occurred after performing the recording continuously on 10 sheets of the paper.

A: One white void having pinhole shape occurred after performing the recording continuously on 10 sheets of the paper.

B: The number of the white void having pinhole shape occurred after performing the recording continuously on 10 sheets of the paper was in a range of not less than 2 to less than 5.

C: The number of the white void having pinhole shape occurred after performing the recording continuously on 10 sheets of the paper was not less than 5.

(c) Evaluation of Re-Dispersibility

12 μL of each of the water-based inks of Examples 1-1 to 1-9 and Comparative Examples 1-1 to 1-4 was added dropwise onto a 2-hole slide glass. Subsequently, the slide glass was stored for 1 day in an environment of a temperature of 60° C. and a relative humidity of 40%. Subsequently, water was added dropwise onto the 2-hole slide glass. The dispersion level of the pigment was evaluated in accordance with the following evaluation criterion.

<Evaluation Criterion for Evaluation of Re-Dispersibility>

AA: Any presence of aggregated matter was not confirmed in an observation using an optical microscope (magnification: ×200).

A: Any presence of aggregated matter was not confirmed in a visual observation.

B: Not less than half portion of aggregated matter was dispersed in the visual observation.

C: Aggregated matter was not dispersed in the visual observation.

(d) Evaluation of Chromaticness

The ink-jet printer MFC-J4510N was used to record an image including a single color solid patch on regular paper ("XEROX 4200" produced by XEROX) under a condition in which the resolution was 600 dpi×300 dpi, by using each of the water-based inks of Examples 1-1 to 1-9 and Comparative Examples 1-1 to 1-4, and thus an evaluation sample was prepared. The chromaticnesses were measured at five positions of each of the evaluation samples by using a spectrophotometric colorimetry meter "SpectroEye" produced by X-RITE, and an average value of the values of chromaticness measured at the five portions was acquired. Then evaluations were made for the respective evaluation samples based on the following evaluation criterion.

<Evaluation Criterion for Evaluation of Chromaticness>

AA: Chromaticness was higher than that of Reference Examples 1-1 or 1-4 by not less than 1.0.

A: Chromaticness was higher than that of Reference Examples 1-1 or 1-4 by a value within a range of 0.5 to 0.9.

B: Chromaticness was higher than that of Reference Examples 1-1 or 1-4 by a value within a range of 0.1 to 0.4.

C: Chromaticness was lowered as compared with that of Reference Examples 1-1 or 1-4.

The water-based ink compositions and the evaluation results of the water-based inks of Examples 1-1 to 1-9 and Comparative Examples 1-1 to 1-4 are indicated in TABLE 3 below. Note that TABLE 3 also indicates the water-based ink compositions of the water-based inks of Reference Examples 1-1 and 1-4, as well.

TABLE 3

| | | EXAMPLE | | | | | |
|---|---|---|---|---|---|---|---|
| | | 1-1 | 1-2 | 1-3 | 1-4 | 1-5 | 1-6 |
| Water-based Ink Composition (% by weight) | Liquid magenta-color pigment dispersion (*1) | 37.50 (4.50) | 37.50 (4.50) | 37.50 (4.50) | 37.50 (4.50) | 37.50 (4.50) | 37.50 (4.50) |
| | Liquid pigment dispersant 4 (*2) | — | — | — | — | — | — |
| | SUNNOL (trade name) NL-1430 (*3) | 3.50 (0.98) | — | — | — | — | — |
| | HITENOL (trade name) 330T (*4) | — | 3.50 (1.23) | — | — | — | — |
| | SANDET (trade name) EN (*5) | — | — | 3.50 (1.09) | — | — | — |
| | SANDET (trade name) END (*6) | — | — | — | 3.50 (0.95) | — | — |
| | ENAGICOL (trade name) EC-30 (*7) | — | — | — | — | 3.30 (0.99) | — |
| | LATEMUL (trade name) E-118B (*8) | — | — | — | — | — | 3.80 (0.99) |
| | EMAL (trade name) 0 (*9) | — | — | — | — | — | — |
| | OLFIN (trade name) E1004 (*10) | 0.20 | 0.20 | 0.20 | 0.20 | 0.20 | 0.20 |
| | Triethylene glycol-n-butyl ether | 4.00 | 4.00 | 4.00 | 4.00 | 4.00 | 4.00 |
| | Glycerol | 15.00 | 15.00 | 15.00 | 15.00 | 16.00 | 15.00 |
| | Tripropylene glycol | 5.00 | 5.00 | 5.00 | 5.00 | 5.00 | 5.00 |
| | Water | balance | balance | balance | balance | balance | balance |
| Pigment dispersant (% by weight) | | 1.6 | 1.6 | 1.6 | 1.6 | 1.6 | 1.6 |
| A/N | | 4.9 | 6.1 | 5.4 | 4.7 | 5.0 | 4.9 |
| (S + G)/R | | 3.3 | 3.4 | 3.4 | 3.3 | 3.3 | 3.3 |
| Occurrence of bending of recording during continuous recording | | AA | AA | AA | AA | A | A |
| Occurrence of white void having pinhole shape during continuous recording | | AA | AA | AA | AA | AA | AA |
| Re-dispersibility | | AA | AA | AA | AA | AA | A |
| Chromaticness | | AA | AA | AA | AA | AA | AA |

| | | EXAMPLE | | |
|---|---|---|---|---|
| | | 1-7 | 1-8 | 1-9 |
| Water-based Ink Composition (% by weight) | Liquid magenta-color pigment dispersion (*1) | 37.50 (4.50) | 37.50 (4.50) | 45.83 (5.50) |
| | Liquid pigment dispersant 4 (*2) | — | — | — |
| | SUNNOL (trade name) NL-1430 (*3) | 3.50 (0.98) | — | 3.50 (0.98) |
| | HITENOL (trade name) 330T (*4) | — | — | — |
| | SANDET (trade name) EN (*5) | — | — | — |
| | SANDET (trade name) END (*6) | — | — | — |
| | ENAGICOL (trade name) EC-30 (*7) | — | — | — |

TABLE 3-continued

|  |  |  |  |  |
|---|---|---|---|---|
| LATEMUL (trade name) E-118B (*8) | — | — | — |  |
| EMAL (trade name) 0 (*9) | — | — | — |  |
| OLFIN (trade name) E1004 (*10) | — | 0.20 | 0.20 |  |
| Triethylene glycol-n-butyl ether | — | — | 4.00 |  |
| Glycerol | 14.00 | 14.00 | 15.00 |  |
| Tripropylene glycol | 5.00 | 5.00 | 5.00 |  |
| Water | balance | balance | balance |  |
| Pigment dispersant (% by weight) | 1.6 | 1.6 | 1.9 |  |
| A/N | — | 0 | 4.9 |  |
| (S + G)/R | 0.6 | 0.1 | 2.7 |  |
| Occurrence of bending of recording during continuous recording | A | B | AA |  |
| Occurrence of white void having pinhole shape during continuous recording | B | AA | AA |  |
| Re-dispersibility | A | B | AA |  |
| Chromaticness | B | A | AA |  |

|  | COMPARATIVE EXAMPLE |  |  |  | REFERENCE EXAMPLE |  |
|---|---|---|---|---|---|---|
|  | 1-1 | 1-2 | 1-3 | 1-4 | 1-1 | 1-4 |
| Water-based Ink Composition (% by weight) Liquid magenta-color pigment dispersion (*1) | — | — | 37.50 (4.50) | 37.50 (4.50) | 37.50 (4.50) | — |
| Liquid pigment dispersant 4 (*2) | 37.50 (4.50) | 37.50 (4.50) | — | — | — | 37.50 (4.50) |
| SUNNOL (trade name) NL-1430 (*3) | 5.00 (1.00) | — | — | — | 3.50 (0.98) | 3.50 (0.98) |
| HITENOL (trade name) 330T (*4) | — | — | — | — | — | — |
| SANDET (trade name) EN (*5) | — | — | — | — | — | — |
| SANDET (trade name) END (*6) | — | — | — | — | — | — |
| ENAGICOL (trade name) EC-30 (*7) | — | — | — | — | — | — |
| LATEMUL (trade name) E-118B (*8) | — | 3.80 (0.99) | — | — | — | — |
| EMAL (trade name) 0 (*9) | — | — | 2.00 (1.94) | — | — | — |
| OLFIN (trade name) E1004 (*10) | 0.20 | 0.20 | — | — | — | — |
| Triethylene glycol-n-butyl ether | 6.00 | 6.00 | 4.00 | 4.00 | 4.00 | 4.00 |
| Glycerol | 12.00 | 13.00 | 16.00 | 18.00 | 15.00 | 15.00 |
| Tripropylene glycol | 5.00 | 5.00 | 5.00 | 5.00 | — | — |
| Water | balance | balance | balance | balance | balance | balance |
| Pigment dispersant (% by weight) | — | — | 1.6 | 1.60 | 1.6 | 1.8 |
| A/N | 7.0 | 4.9 | — | — | — | — |
| (S + G)/R | — | — | 3.8 | 2.50 | 3.2 | 2.8 |
| Occurrence of bending of recording during continuous recording | C | C | C | C | — | — |
| Occurrence of white void having pinhole shape during continuous recording | A | A | B | AA | — | — |
| Re-dispersibility | C | C | B | A | — | — |
| Chromaticness | AA | AA | B | B | — | — |

LEGEND
(*1): numerals in parentheses indicate the pigment solid content amount.
(*2): numerals in parentheses indicate the pigment solid content amount.
(*3): EO group-including anionic surfactant represented by the formula (1) (m = 3); produced by LION CORPORATION, active ingredient = 28% by weight; numerals in parentheses indicate the active ingredient amount.
(*4): EO group-including anionic surfactant represented by the formula (1) (m = 3); produced by DAI-ICHI KOGYO SEIYAKU CO. LTD., active ingredient = 35% by weight; numeral in parentheses indicates the active ingredient amount.
(*5): EO group-including anionic surfactant represented by the formula (1) (m = 2), produced by SANYO CHEMICAL INDUSTRIES, LTD., active ingredient = 31% by weight; numeral in parentheses indicates the active ingredient amount.
(*6): EO group-including anionic surfactant represented by the formula (1) (m = 3), produced by SANYO CHEMICAL INDUSTRIES, LTD., active ingredient = 27% by weight; numeral in parentheses indicates the active ingredient amount.
(*7): EO group-including anionic surfactant represented by the formula (2) (n = 3), produced by LION CORPORATION, active ingredient = 30% by weight; numeral in parentheses indicates the active ingredient amount.
(*8): EO group-including anionic surfactant represented by the formula (1) (m = 18), produced by KAO CORPORATION, active ingredient = 26% by weight; numerals in parentheses indicate the active ingredient amount.
(*9): Anionic surfactant containing no EO group, produced by KAO CORPORATION, active ingredient = 97% by weight; numeral in parentheses indicates the active ingredient amount.
(*10): EO group-including nonionic surfactant produced by NISSHIN CHEMICAL CO., LTD.; active ingredient = 100% by weight.

As indicated in TABLE 3, Examples 1-1 to 1-9 had satisfactory results in the evaluation of the occurrence of bending of recording during continuous recording, the evaluation of occurrence of white void having the pinhole shape during continuous recording, the evaluation of re-dispersibility and the evaluation of chromaticness. In particular, Examples 1-1 to 1-6 and 1-9 each of which used both of the EO group-including anionic surfactant and the EO group-including nonionic surfactant had quite excellent results in the evaluation of occurrence of white void having the pinhole shape during continuous recording and the evaluation of chromaticness. Further, Examples 1-1 to 1-4 and 1-9 each using the anionic surfactant which is represented by the formula (1) and in which m=2 to 17 had quite excellent result also in the evaluation of the occurrence of bending of recording during continuous recording and the evaluation of re-dispersibility.

On the other hand, Comparative Examples 1-1 and 1-2 each of which did not use the pigment dispersing resin including the EO chain had unsatisfactory results in the evaluation of the occurrence of bending of recording during continuous recording and the evaluation of re-dispersibility. Further, Comparative Examples 1-3 and 1-4 each of which did not use the EO group-including anionic surfactant and the EO group-including nonionic surfactant had unsatisfactory result in the evaluation of the occurrence of bending of recording during continuous recording.

Examples 2-1 and 2-2

Examples 2-1 and 2-2 are each an example in which the EO group-including glycol ether was not used. Components, except for the liquid pigment dispersion, which were included in Water-based Ink Composition (TABLE 4) as indicated below were mixed uniformly or homogeneously; and thus an ink solvent was obtained. Subsequently, the ink solvent was added to the liquid pigment dispersion, followed by being mixed uniformly. After that, the obtained mixture was filtrated through a cellulose acetate membrane filter (pore size 3.00 μm) produced by TOYO ROSHI KAISHA, LTD., and thus a water-based ink for ink-jet recording of each of Examples 2-1 and 2-2 was obtained.

The water-based inks of Examples 2-1 and 2-2 were subjected to the evaluation of the occurrence of bending of recording during continuous recording, the evaluation of occurrence of white void having the pinhole shape during continuous recording, the evaluation of re-dispersibility and the evaluation of chromaticness, in a similar manner as regarding the water-based inks of Examples 1-1 to 1-9 and Comparative Examples 1-1 to 1-4.

The water-based ink compositions and the evaluation results of the water-based inks of Example 2-1 and 2-2 are indicated in TABLE 4 below. Note that TABLE 4 also indicates the ink composition and the results of evaluations for the water-based ink of Example 1-1 and the ink composition of the water-based ink of Reference Example 1-1, as well.

TABLE 4

|  |  | EXAMPLE | | | REF. |
|---|---|---|---|---|---|
|  |  | 1-1 | 2-1 | 2-2 | EX. 1-1 |
| Water-based Ink Composition (% by weight) | Liquid magenta-color pigment dispersion (*1) | 37.50 (4.50) | 37.50 (4.50) | 37.50 (4.50) | 37.50 (4.50) |
|  | SUNNOL (trade name) NL-1430 (*3) | 3.50 (0.98) | 3.50 (0.98) | 3.50 (0.98) | 3.50 (0.98) |
|  | OLFIN (trade name) E1004 (*10) | 0.20 | 0.20 | 0.20 | — |
|  | Triethylene glycol-n-butyl ether | 4.00 | — | — | 4.00 |
|  | Tripropylene glycol-n-butyl ether | — | — | 2.00 | — |
|  | Glycerol | 15.00 | 15.00 | 15.00 | 15.00 |
|  | Tripropylene glycol | 5.00 | 5.00 | 5.00 | — |
|  | Water | balance | balance | balance | balance |
|  | Pigment dispersant (% by weight) | 1.6 | 1.6 | 1.6 | 1.6 |
|  | A/N | 4.9 | 4.9 | 4.9 | — |
|  | (S + G)/R | 3.3 | 0.7 | 2.0 | 3.2 |
| Occurrence of bending of recording during continuous recording |  | AA | A | A | — |
| Occurrence of white void having pinhole shape during continuous recording |  | AA | A | A | — |
| Re-dispersibility |  | AA | A | A | — |
| Chromaticness |  | AA | A | A | — |

LEGEND
(*1): numerals in parentheses indicate the pigment solid content amount.
(*3): EO group-including anionic surfactant represented by the formula (1) (m = 3), produced by LION CORPORATION, active ingredient = 28% by weight; numerals in parentheses indicated the active ingredient amount.
(*10): EO group-including nonionic surfactant produced by NISSHIN CHEMICAL CO., LTD.; active ingredient = 100% by weight.
"REF. EX." represents the reference example.

As indicated in TABLE 4, Examples 2-1 and 2-2 had satisfactory results in the evaluation of the occurrence of bending of recording during continuous recording, the evaluation of occurrence of white void having the pinhole shape during continuous recording, the evaluation of re-dispersibility and the evaluation of chromaticness. Note that, however, Examples 2-1 and 2-2 each of which did not use the EO group-including glycol ether had the results in the evaluation of the occurrence of bending of recording during continuous recording, the evaluation of occurrence of white void having the pinhole shape during continuous recording, the evaluation of re-dispersibility and the evaluation of chromaticness that were less satisfactory to some extent as compared with those of Example 1-1 which used the EO group-including glycol ether.

Examples 3-1 to 3-5

Examples 3-1 to 3-5 are each an example in which the above-described weight ratio A/N and the above-described (S+G)/R were changed. Components, except for the liquid pigment dispersion, which were included in Water-based Ink Composition (TABLE 5) as indicated below were mixed uniformly or homogeneously; and thus an ink solvent was obtained. Subsequently, the ink solvent was added to the liquid pigment dispersion, followed by being mixed uniformly. After that, the obtained mixture was filtrated through a cellulose acetate membrane filter (pore size 3.00 μm) produced by TOYO ROSHI KAISHA, LTD., and thus a water-based ink for ink-jet recording of each of Examples 3-1 to 3-5 was obtained.

The water-based inks of Examples 3-1 to 3-5 were subjected to the evaluation of the occurrence of bending of recording during continuous recording, the evaluation of occurrence of white void having the pinhole shape during continuous recording, the evaluation of re-dispersibility and the evaluation of chromaticness, in a similar manner as regarding the water-based inks of Examples 1-1 to 1-9 and Comparative Examples 1-1 to 1-4.

The ink compositions and the evaluation results of the water-based inks of Examples 3-1 to 3-5 are indicated in TABLE 5 below. Note that TABLE 5 also indicates the ink composition and the results of evaluations for the water-based ink of Example 1-1 and the ink composition of Reference Example 1-1, as well.

As indicated in TABLE 5, Examples 3-1 to 3-5 had satisfactory results in the evaluation of the occurrence of bending of recording during continuous recording, the evaluation of occurrence of white void having the pinhole shape during continuous recording, the evaluation of re-dispersibility and the evaluation of chromaticness. In particular, Examples 1-1, 3-1, 3-2 and 3-5 in each of which A/N was in a range of A/N=2.8 to 6.1; and 2≤(S+G)/R≤5 held had quite excellent results in the evaluation of the occurrence of bending of recording during continuous recording, the evaluation of occurrence of white void having the pinhole shape during continuous recording, the evaluation of re-dispersibility and the evaluation of chromaticness.

Examples 4-1 and 4-2

Examples 4-1 and 4-2 are each an example in which the liquid pigment dispersion was changed. Components, except for the liquid pigment dispersion, which were included in Water-based Ink Composition (TABLE 6) as indicated below were mixed uniformly or homogeneously; and thus an ink solvent was obtained. Subsequently, the ink solvent was added to the liquid pigment dispersion, followed by being mixed uniformly. After that, the obtained mixture was filtrated through a cellulose acetate membrane filter (pore size 3.00 μm) produced by TOYO ROSHI KAISHA, LTD., and thus a water-based ink for ink-jet recording of each of Examples 4-1 and 4-2 was obtained. Further, a water-based ink for ink-jet recording for each of Reference Example 4-1 and 4-2 as a control for the evaluations of chromaticness (color) of each of Comparative Examples 4-1 and 4-2 were obtained in a similar manner as those for obtaining the water-based inks of Examples 4-1 and 4-2.

TABLE 5

| | | EXAMPLE | | | | | | REF. EX. |
|---|---|---|---|---|---|---|---|---|
| | | 1-1 | 3-1 | 3-2 | 3-3 | 3-4 | 3-5 | 1-1 |
| Water-based Ink Composition (% by weight) | Liquid magenta-color pigment dispersion (*1) | 37.50 (4.50) | 37.50 (4.50) | 37.50 (4.50) | 37.50 (4.50) | 37.50 (4.50) | 37.50 (4.50) | 37.50 (4.50) |
| | SUNNOL (trade name) NL-1430 (*3) | 3.50 (0.98) | 7.00 (1.96) | 2.00 (0.56) | 7.00 (1.96) | 0.50 (0.14) | 3.50 (0.98) | 3.50 (0.98) |
| | OLFIN (trade name) E1004 (*10) | 0.20 | 0.40 | 0.20 | 0.20 | 0.20 | 0.20 | — |
| | Triethylene glycol-n-butyl ether | 4.00 | 5.50 | 2.40 | 6.00 | 2.50 | 2.00 | 4.00 |
| | Glycerol | 15.00 | 7.00 | 18.00 | 7.00 | 15.00 | 15.00 | 15.00 |
| | Tripropylene glycol | 5.00 | 5.00 | 5.00 | 5.00 | 5.00 | 5.00 | — |
| | Water | balance | balance | balance | balance | balance | balance | balance |
| Pigment dispersant (% by weight) | | 1.6 | 1.6 | 1.6 | 1.6 | 1.6 | 1.6 | 1.6 |
| A/N | | 4.9 | 4.9 | 2.8 | 9.8 | 0.7 | 4.9 | — |
| (S + G)/R | | 3.3 | 5.0 | 2.0 | 5.2 | 1.8 | 2.0 | 3.2 |
| Occurrence of bending of recording during continuous recording | | AA | AA | AA | AA | A | AA | — |
| Occurrence of white void having pinhole shape during continuous recording | | AA | AA | AA | A | AA | AA | — |
| Re-dispersibility | | AA | AA | AA | A | A | AA | — |
| Chromaticness | | AA | AA | AA | AA | AA | AA | — |

LEGEND
(*1): numerals in parentheses indicate the pigment solid content amount.
(*3): EO group-including anionic surfactant represented by the formula (1) (m = 3), produced by LION CORPORATION, active ingredient = 28% by weight; numerals in parentheses indicate the active ingredient amount.
(*10): EO group-including nonionic surfactant produced by NISSHIN CHEMICAL CO., LTD.; active ingredient = 100% by weight.
"REF. EX." represents the reference example.

The water-based inks of Examples 4-1 and 4-2 were subjected to the evaluation of the occurrence of bending of recording during continuous recording, the evaluation of occurrence of white void having the pinhole shape during continuous recording, the evaluation of re-dispersibility and the evaluation of chromaticness, in a similar manner as regarding the water-based inks of Examples 1-1 to 1-9 and Comparative Examples 1-1 to 1-4.

The ink compositions and the evaluation results of the water-based inks of Examples 4-1 and 4-2 are indicated in TABLE 6 below. Note that TABLE 6 also indicates the ink composition and the results of evaluations for the water-based ink of Example 1-1 and the ink compositions of Reference Examples 1-1 and Reference Examples 4-1 and 4-2, as well.

TABLE 6

|  |  | EXAMPLE | | | REFERENCE EXAMPLE | | |
|---|---|---|---|---|---|---|---|
|  |  | 1-1 | 4-1 | 4-2 | 1-1 | 4-1 | 4-2 |
| Water-based Ink Composition (% by weight) | Liquid magenta-color pigment dispersion (*1) | 37.50 (4.50) | — | — | 37.50 (4.50) | — | — |
|  | Liquid cyan-color pigment dispersion (*11) | — | 37.50 (4.50) | — | — | 37.50 (4.50) | — |
|  | Liquid yellow-color pigment dispersion (*12) | — | — | 37.50 (4.50) | — | — | 37.50 (4.50) |
|  | SUNNOL (trade name) NL-1430 (*3) | 3.50 (0.98) | 3.00 (0.84) | 3.00 (0.84) | 3.50 (0.98) | 3.50 (0.98) | 3.50 (0.98) |
|  | OLFIN (trade name) E1004 (*10) | 0.20 | 0.20 | 0.20 | — | — | — |
|  | Triethylene glycol-n-butyl ether | 4.00 | 4.00 | 4.00 | 4.00 | 4.00 | 4.00 |
|  | Glycerol | 15.00 | 16.00 | 16.00 | 15.00 | 15.00 | 15.00 |
|  | Tripropylene glycol | 5.00 | 5.00 | 5.00 | — | — | — |
|  | Water | balance | balance | balance | balance | balance | balance |
| Pigment dispersant (% by weight) |  | 1.6 | 1.1 | 1.8 | 1.6 | 1.1 | 1.8 |
| A/N |  | 4.9 | 4.2 | 4.2 | — | — | — |
| (S + G)/R |  | 3.3 | 4.5 | 2.8 | 3.2 | 4.4 | 2.8 |
| Occurrence of bending of recording during continuous recording |  | AA | AA | AA | — | — | — |
| Occurrence of white void having pinhole shape during continuous recording |  | AA | AA | AA | — | — | — |
| Re-dispersibility |  | AA | AA | AA | — | — | — |
| Chromaticness |  | AA | AA | AA | — | — | — |

LEGEND
(*1): numerals in parentheses indicate the pigment solid content amount.
(*11): numerals in parentheses indicate the pigment solid content amount.
(*12): numerals in parentheses indicate the pigment solid content amount.
(*3): EO group-including anionic surfactant represented by the formula (1) (m = 3), produced by LION CORPORATION, active ingredient = 28% by weight; numerals in parentheses indicate the active ingredient amount.
(*10): EO group-including nonionic surfactant produced by NISSHIN CHEMICAL CO., LTD.; active ingredient = 100% by weight.

As indicated in TABLE 6, Examples 4-1 and 4-2 had quite excellent results in the evaluation of the occurrence of bending of recording during continuous recording, the evaluation of occurrence of white void having the pinhole shape during continuous recording, the evaluation of re-dispersibility and the evaluation of chromaticness, similarly to those of Examples 1-1.

As described above, the water-based ink related to the present teaching is capable of improving the discharging stability during continuous recording and is excellent in the re-dispersibility as well. The usage of the water-based ink related to the resent teaching is not particularly limited, and is widely applicable to a variety of kinds of ink-jet recording.

What is claimed is:

1. A water-based ink for ink-jet recording comprising:
a pigment;
water;
a water-soluble pigment dispersing resin polymer including an ethylene oxide chain; and
an anionic surfactant including an ethylene oxide group and a nonionic surfactant including an ethylene oxide group.

2. The water-based ink for ink-jet recording according to claim 1, further comprising glycol ether including an ethylene oxide group.

3. The water-based ink for ink-jet recording according to claim 1, wherein the anionic surfactant including the ethylene oxide group is contained in the water-based ink in a range of 0.14% by weight to 1.96% by weight.

4. The water-based ink for ink-jet recording according to claim 1, wherein the nonionic surfactant including the ethylene oxide group is contained in the water-based ink in a range of 0.2% by weight to 0.4% by weight.

5. The water-based ink for ink-jet recording according to claim 2, wherein the glycol ether including the ethylene oxide group is contained in the water-based ink in a range of 2% by weight to 6% by weight.

6. The water-based ink for ink-jet recording according to claim 1, wherein a weight ratio of the anionic surfactant including the ethylene oxide group to the nonionic surfactant including the ethylene oxide group is in a range of 2.8 to 6.1.

7. The water-based ink for ink-jet recording according to claim 2, satisfying following condition (I):

$$2 \leq (S+G)/R \leq 5 \qquad \text{Condition (I):}$$

wherein in the condition (I),

S: a blending amount (% by weight) of the anionic surfactant including the ethylene oxide group and the nonionic surfactant including the ethylene oxide group in the water-based ink;

G: a blending amount (% by weight) of the glycol ether including the ethylene oxide group in the water-based ink; and R: a blending amount (% by weight) of the pigment dispersing resin in the water-based ink.

8. The water-based ink for ink-jet recording according to claim 1, wherein the anionic surfactant including the ethylene oxide group is at least one of a compound represented by the following formula (1) and a compound represented by the following formula (2):

(1)

in the formula (1), $R^1$ is a straight-chain alkyl group of which number of carbon atoms is 4 to 18;

m is 2 to 18; and

M is an alkali metal, alkali earth metal, ammonium or alkanol amine;

(2)

n is 2 to 5; and

M is an alkali metal, alkali earth metal, ammonium or alkanol amine.

9. The water-based ink for ink-jet recording according to claim 8, wherein in the formula (1), m is in a range of m=2 to 17.

10. The water-based ink for ink-jet recording according to claim 8, wherein in the formula (1), m is in a range of m=2 to 3.

11. The water-based ink for ink-jet recording according to claim 8, wherein the anionic surfactant including the ethylene oxide group is the compound represented by the formula (1).

12. The water-based ink for ink-jet recording according to claim 1, wherein the nonionic surfactant including the ethylene oxide group is a compound represented by the following formula (3):

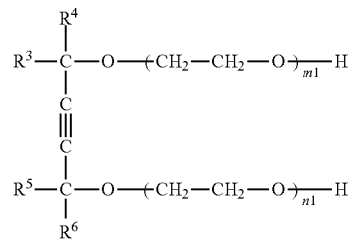

(3)

wherein in the formula (3), m1 and n1 are same with each other or different from each other, and are numbers satisfying: m1+n1=1 to 15;

$R^3$, $R^4$, $R^5$ and $R^6$ are same to one another or different from one another, and each of $R^3$, $R^4$, $R^5$ and $R^6$ is a straight-chain or branched-chain alkyl group of which number of carbon atoms is 1 to 5.

13. The water-based ink for ink-jet recording according to claim 12, wherein in the formula (3), m1+n1=4 and each of $R^3$ and $R^5$ is a methyl group and each of $R^4$ and $R^6$ is an isobutyl group.

14. The water-based ink for ink-jet recording according to claim 2, wherein each of the anionic surfactant including the ethylene oxide group, the nonionic surfactant including the ethylene oxide group, and the glycol ether including the ethylene oxide group includes an ethylene oxide chain composed of two or three of the ethylene oxide groups.

15. The water-based ink for ink-jet recording according to claim 1, wherein the pigment is C.I. Pigment Red 122.

16. The water-based ink for ink-jet recording according to claim 1, wherein acid value of the pigment dispersing resin including the ethylene oxide chain is in a range of 40 mg/KOH/g to 200 mg/KOH/g.

17. The water-based ink for ink-jet recording according to claim 1, wherein number-average molecular weight of the pigment dispersing resin including the ethylene oxide chain is in a range of 1,000 to 100,000.

18. The water-based ink for ink-jet recording according to claim 1, wherein the pigment dispersing resin including the ethylene oxide chain is neutralized by lithium hydroxide or potassium hydroxide.

19. The water-based ink for ink-jet recording according to claim 1, wherein the pigment dispersing resin including the ethylene oxide chain includes, as a monomer, (meth)acrylate having an ethylene oxide chain.

20. An ink cartridge comprising the water-based ink for ink-jet recording as defined in claim 1.

21. The water-based ink for ink-jet recording according to claim 1, further comprising glycerol and tripropylene glycol.

* * * * *